United States Patent
Kobayashi et al.

(10) Patent No.: US 9,199,544 B2
(45) Date of Patent: Dec. 1, 2015

(54) METHOD OF CONTROLLING ELECTRIC VEHICLE

(71) Applicant: HONDA MOTOR CO., LTD., Tokyo (JP)

(72) Inventors: Shinya Kobayashi, Utsunomiya (JP); Dai Saitoh, Shimotsuke (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/362,497

(22) PCT Filed: Oct. 30, 2012

(86) PCT No.: PCT/JP2012/077954
§ 371 (c)(1),
(2) Date: Jun. 3, 2014

(87) PCT Pub. No.: WO2013/084624
PCT Pub. Date: Jun. 13, 2013

(65) Prior Publication Data
US 2014/0350759 A1    Nov. 27, 2014

(30) Foreign Application Priority Data
Dec. 9, 2011  (JP) .................................. 2011-269579

(51) Int. Cl.
*B60L 9/00*    (2006.01)
*B60L 11/00*    (2006.01)
(Continued)

(52) U.S. Cl.
CPC ............... *B60L 11/1814* (2013.01); *B60L 7/14* (2013.01); *B60L 11/1803* (2013.01);
(Continued)

(58) Field of Classification Search
CPC ........... B60L 11/1803; B60L 15/2018; B60W 30/18127
USPC ........................................................... 701/22
See application file for complete search history.

(56) References Cited

U.S. PATENT DOCUMENTS 5,915,801 A * 6/1999 Taga et al. .................... 303/152
6,033,041 A    3/2000 Koga et al.
(Continued)

FOREIGN PATENT DOCUMENTS

EP     1316464 A2    6/2003
JP    06-070406 A    3/1994
(Continued)

OTHER PUBLICATIONS

International Search Report dated Dec. 18, 2012 corresponding to International Patent Application No. PCT/JP2012/077954 and English translation thereof.

*Primary Examiner* — Imran Mustafa
(74) *Attorney, Agent, or Firm* — Squire Patton Boggs (US) LLP

(57) ABSTRACT

Provided is a method of controlling an electric vehicle capable of preferably performing a regenerative control when a plurality of forward driving ranges are shifted to each other. During travelling on a downhill road, an electric vehicle executes a downhill regenerative control for adjusting the regenerative amount of an electric motor so that acceleration obtained when an accelerator is closed becomes a downhill acceleration according to a road surface slope. The downhill acceleration obtained when a second forward driving range is selected, in which the deceleration of the electric vehicle becomes larger than that in a first forward driving range, is smaller over the entire range of the set road surface slope than the downhill acceleration obtained when the first forward driving range is selected.

3 Claims, 12 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60L 11/18* (2006.01)
  *B60L 7/14* (2006.01)
  *B60L 15/20* (2006.01)
  *B60W 30/18* (2012.01)

(52) U.S. Cl.
  CPC ..... *B60L 15/2018* (2013.01); *B60W 30/18127* (2013.01); *B60L 2240/12* (2013.01); *B60L 2240/423* (2013.01); *B60L 2250/26* (2013.01); *Y02T 10/642* (2013.01); *Y02T 10/7005* (2013.01); *Y02T 10/7275* (2013.01)

(56) References Cited

U.S. PATENT DOCUMENTS

| | | | |
|---|---|---|---|
| 2008/0319601 A1* | 12/2008 | Komeda et al. | 701/29 |
| 2009/0112386 A1* | 4/2009 | Saitoh et al. | 701/22 |
| 2011/0033762 A1* | 2/2011 | Yoshida | 429/428 |

FOREIGN PATENT DOCUMENTS

| | | |
|---|---|---|
| JP | 9-37407 A | 2/1997 |
| JP | 2003-164013 A | 6/2003 |
| JP | 2009-106130 A | 5/2009 |
| JP | 2009-303342 A | 12/2009 |
| WO | WO 97/10966 A1 | 3/1997 |
| WO | WO 2010/110098 A1 | 9/2010 |

* cited by examiner

METHOD OF CONTROLLING ELECTRIC VEHICLE

TECHNICAL FIELD

The present invention relates to a method of controlling an electric vehicle having a shift range switching device, e.g., a shift lever, for switching between a parking range, a reverse driving range, a first forward driving range, and a second forward driving range as shift ranges, and more particularly to a method of controlling an electric vehicle capable of suitably performing a regenerative control process in the first forward driving range and the second forward driving range.

BACKGROUND ART

U.S. Patent Application Publication No. 2009/0112386 (hereinafter referred to as "US 2009/0112386 A1") discloses a regenerative control process for an electric motor on an electric vehicle while the electric vehicle is driving on a downhill road. More Specifically, US 2009/0112386 A1 has the task of operating the electric motor in a regenerative mode while the electric vehicle is driving on a downhill road, in order to cause the vehicle to generate an acceleration suitable for the gradient of the road surface while at the same time minimizing the influences of disturbance factors (see Abstract and paragraph [0007]). In order to carry out the task, according to US 2009/0112386 A1, the electric vehicle has a device 25 for determining, depending on the gradient of the road surface, a target acceleration for the vehicle 1 if the operational states of an accelerator pedal and a brake pedal of the vehicle 1 are an OFF state when the vehicle 1 is driving on a downhill road, a device 26 for determining a correction quantity ΔTrd of a regenerative torque for bringing the actual acceleration of the vehicle 1 close to the target acceleration, a device 21 for determining a basic target torque Trs for an electric motor 2, which becomes a regenerative torque at the time the operational state of the accelerator pedal is the OFF state, depending on the operational state of the accelerator pedal, and a device 27 for determining a target torque Trc by correcting the basic target torque Trs with at least the correction quantity ΔTrd, wherein the output torque of the electric motor 2 is controlled depending on the target torque Trc (see Abstract).

Electric vehicles include an electric vehicle that is capable of driving forward in a plurality of modes, or stated otherwise, an electric vehicle having a plurality of forward driving ranges {International Publication No. 2010/110098 (hereinafter referred to as "WO 2010/110098 A1")}. WO 2010/110098 A1 shows a D position and a B position as corresponding to forward driving positions among the shift positions of a shift lever 32 (see FIG. 2). The D position corresponds to a D range which is a forward driving range for transmitting the drive force for moving the vehicle forward to the drive wheels, whereas the B position corresponds to a decelerated forward driving range (engine braking range) for generating an engine braking effect to decelerate the drive wheels as by causing the electric motor to generate a regenerative torque, for example, in the D range (see paragraphs [0049] and [0050]).

SUMMARY OF INVENTION

According to US 2009/0112386 A1, as described above, it is possible to perform the regenerative control process suitable for a downhill road. However, the regenerative control process does not take into account a plurality of forward driving ranges.

The present invention has been made in view of the above problems. It is an object of the present invention to provide a method of controlling an electric vehicle which is capable of suitably performing a regenerative control process at the time a plurality of forward driving ranges are switched from one to another.

According to the present invention, there is provided a method of controlling an electric vehicle having a shift range switching device for switching between a parking range, a reverse driving range, a first forward driving range, and a second forward driving range as shift ranges, the method including, when the driver closes an accelerator of the electric vehicle on a flat road, carrying out an accelerator regenerative control process for applying, to the electric vehicle, a braking force equivalent to engine braking by regenerative electric generation by an electric motor, wherein a deceleration of the electric vehicle in the accelerator regenerative control process at the time the second forward driving range is selected, is greater than a deceleration of the electric vehicle in the accelerator regenerative control process at the time the first forward driving range is selected, and when the electric vehicle is driving on a downhill road, carrying out a downhill regenerative control process for adjusting the amount of electric power regenerated by the electric motor such that the acceleration of the electric vehicle at the time the accelerator is closed, is equal to a downhill acceleration depending on a road surface gradient, wherein the downhill acceleration at the time the second forward driving range is selected is smaller than the downhill acceleration at the time the first forward driving range is selected, throughout a region of the road surface gradient that is established as a control range.

According to the present invention, in each of the accelerator regenerative control process and the downhill regenerative control process, the deceleration in the second forward driving range is greater than the deceleration in the first forward driving range. Therefore, when the shift range is switched from the first forward driving range to the second forward driving range, the deceleration of the electric vehicle is increased irrespectively of whether the electric vehicle is driving on a flat road or a downhill road. The electric vehicle thus can make the driver feel decelerated, and prevent the driver from having a feeling of irresponsiveness to the driver's operation. Further, when the shift range is switched from the second forward driving range to the first forward driving range, the electric vehicle can make the driver feel accelerated irrespectively of whether the electric vehicle is driving on a flat road or a downhill road. Thus, the electric vehicle can prevent the driver from feeling strange and uncomfortable due to the unchanged acceleration. Consequently, it is possible to perform an appropriate regenerative control process for an electric vehicle which has a plurality of forward driving ranges.

The difference between the downhill acceleration at the time the first forward driving range is selected and the downhill acceleration at the time the second forward driving range is selected may be equal to the difference between the deceleration in the accelerator regenerative control process at the time the first forward driving range is selected and the deceleration in the accelerator regenerative control process at the time the second forward driving range is selected.

When the road surface gradient is steeper than a prescribed value, the difference between the downhill acceleration at the time the first forward driving range is selected and the downhill acceleration at the time the second forward driving range is selected may be smaller than when the road surface gradient is more gradual than the prescribed value.

The prescribed value may be a value of the road surface gradient at which the downhill acceleration changes from a positive value to a negative value when the shift range is switched from the first forward driving range to the second forward driving range.

DESCRIPTION OF EMBODIMENTS

A. First Embodiment
1. Description of Overall Arrangement
[1-1. Overall Arrangement]

Figure 1:
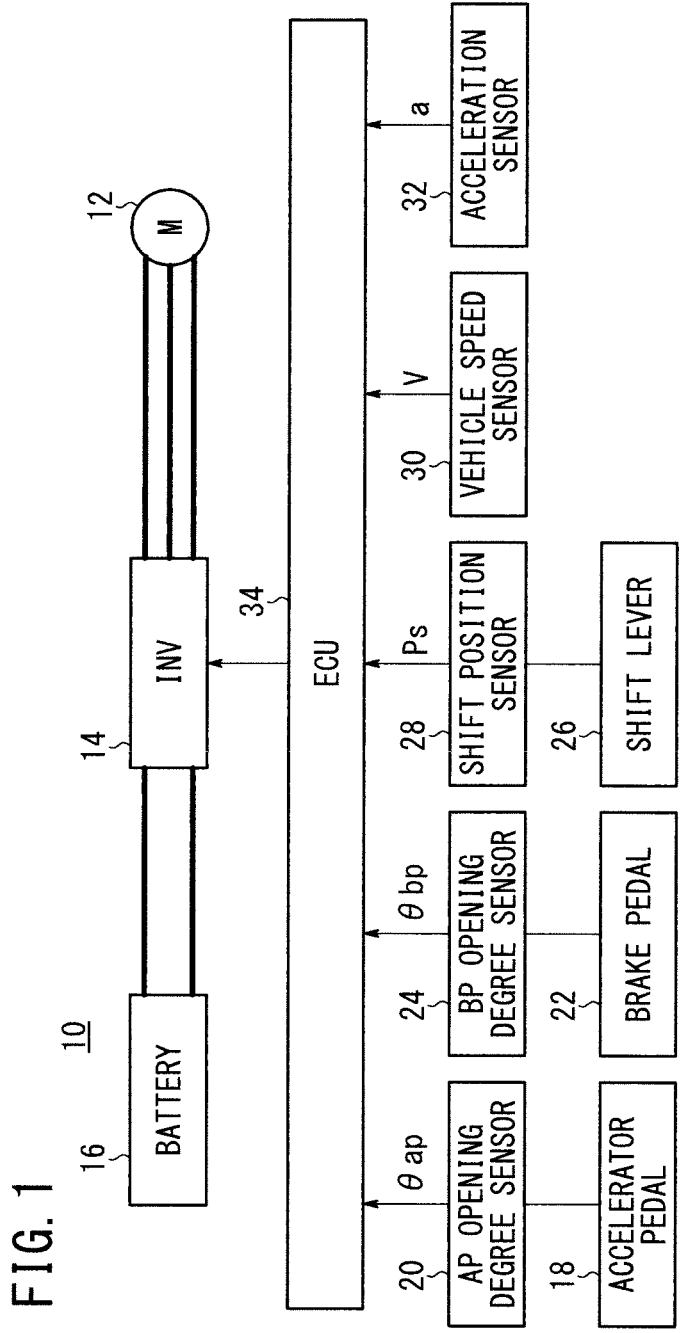
FIG. 1 is a block diagram of an overall arrangement of an electric vehicle according to a first embodiment of the present invention.

FIG. 1 shows in block form an overall arrangement of an electric vehicle 10 according to a first embodiment of the present invention. The electric vehicle 10 (hereinafter also referred to as "vehicle 10") includes a traction motor 12 (hereinafter referred to as "motor 12"), an inverter 14, a battery 16, an accelerator pedal 18, an accelerator pedal opening degree sensor 20 (hereinafter referred to as "AP opening degree sensor 20"), a brake pedal 22, a brake pedal opening degree sensor 24 (hereinafter referred to as "BP opening degree sensor 24"), a shift lever 26 (shift range switching device), a shift position sensor 28, a vehicle speed sensor 30, an acceleration sensor 32, and an electronic control unit 34 (hereinafter referred to as "ECU 34").

[1-2. Electric Power System]

The motor 12 (electric motor) comprises a three-phase AC brushless motor which generates a drive force (hereinafter referred to as "motor drive force F" or "drive force F") [N] (or torque [N·m]) for the vehicle 10 based on electric power supplied from the battery 16 through the inverter 14. The motor 12 also operates in a regenerative mode to regenerate electric power (hereinafter referred to as "regenerated electric power Preg") [W] and supplies the regenerated electric power Preg to the battery 16 to charge the battery 16. The motor 12 may supply the regenerated electric power Preg to auxiliaries, not shown.

The inverter 14, which is of the three-phase bridge configuration, performs DC/AC conversion, converts direct current into three-phase alternating current and supplies the three-phase alternating current to the motor 12. Further, when the motor 12 operates in the regenerative mode, the inverter 14 converts alternating current into direct current and supplies the direct current to the battery 16.

The battery 16 comprises an electric energy storage device (energy storage device) including a plurality of battery cells, and may be a lithium ion secondary battery, a nickel hydrogen secondary battery, a capacitor, or the like. According to the first embodiment, a lithium ion secondary battery is used as the battery 16. A DC/DC converter, not shown, may be connected between the inverter 14 and the battery 16 for stepping up or down the output voltage from the battery 16 or the output voltage from the motor 12.

[1-3. Various Sensors]

The AP opening degree sensor 20 detects a depressed amount (hereinafter referred to as "AP opening degree θap") [degrees] of the accelerator pedal 18 from its original position, and supplies the detected AP opening degree θap to the ECU 34. The BP opening degree sensor 24 detects a depressed amount (hereinafter referred to as "BP opening degree θbp") [degrees] of the brake pedal 22 from its original position, and supplies the detected BP opening degree θbp to the ECU 34.

The shift position sensor 28 detects a position (hereinafter referred to as "shift position Ps") of the shift lever 26, and supplies the detected shift position Ps to the ECU 34. According to the first embodiment, the shift positions Ps include "P" corresponding to a parking range as a shift range, "N" corresponding to a neutral range as a shift range, "R" corresponding to a reverse driving range as a shift range, "D" corresponding to a D range (first forward driving range) as a shift range, and "B" corresponding to a B range (second forward driving range) as a shift range.

Each of the D range and the B range is a forward driving range as a shift range. The D range is used when the vehicle 10 is driven normally, i.e., when the vehicle 10 is driving not in the B range. The B range is a shift range in which the amount of electric power regenerated by the motor 12 is made greater than in the D range when the driver of the vehicle 10 wants to increase the amount of electric power regenerated by the vehicle 10, i.e., the motor 12 (e.g., when the vehicle 10 is driving on a downhill road).

The vehicle speed sensor 30 detects an actual vehicle speed V [km/h] of the vehicle 10 and supplies the detected actual vehicle speed V to the ECU 34. The acceleration sensor 32 detects an actual acceleration a [m/s/s] of the vehicle 10 and supplies the detected actual acceleration a to the ECU 34. According to the first embodiment, the acceleration a is used to estimate the gradient (hereinafter referred to as "road surface gradient G" or "gradient G") of the road on which the vehicle 10 is driving, as described in detail later.

[1-4. ECU 34]

The ECU 34 controls the inverter 14 based on output signals from the various sensors to control the output power of the motor 12 (electric motor output power). The ECU 34 has an input/output unit, a processor, and a memory, all not shown.

2. Control Processes According to the First Embodiment

Various control processes (including a motor drive force control process) according to the first embodiment will be described below.

[2-1. Motor Drive Force Control Process]

Figure 2:
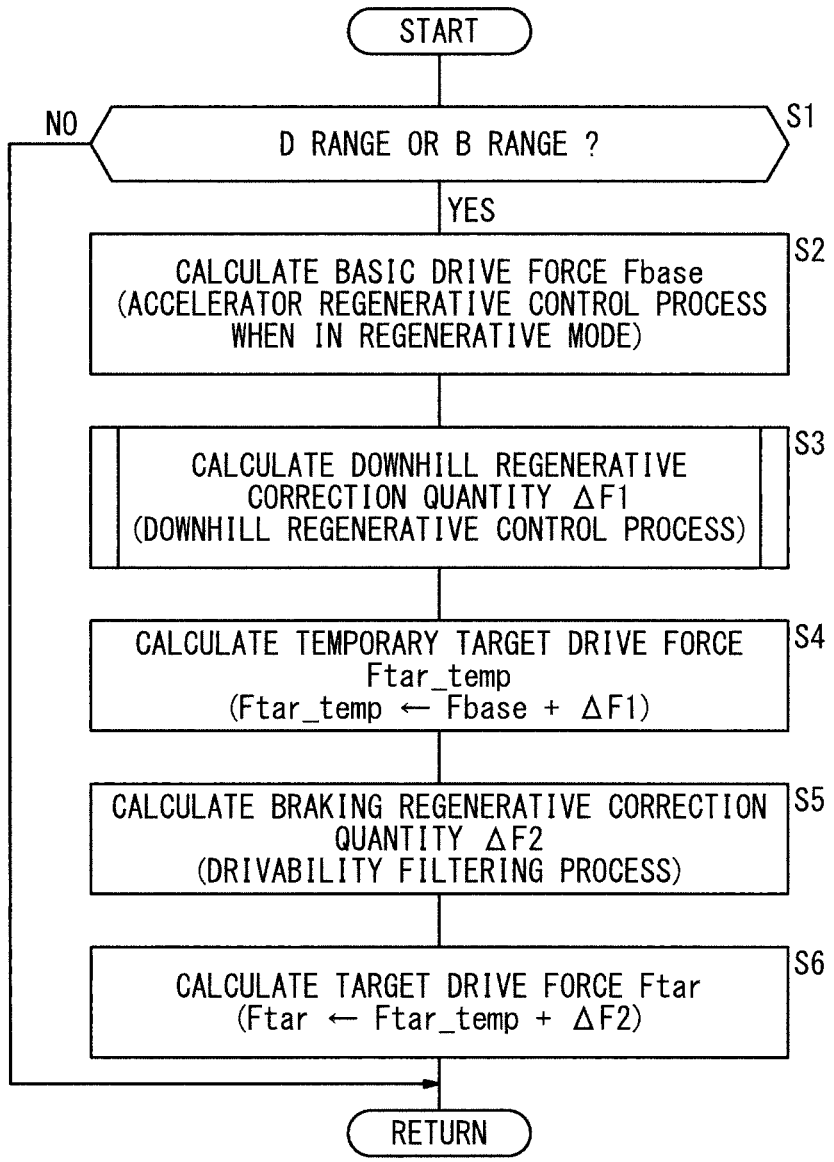
FIG. 2 is a flowchart of a process of controlling the drive force of a traction motor in a D range or a B range according to the first embodiment.

FIG. 2 is a flowchart of a process of controlling the drive force F of the motor 12 in the D range or the B range according to the first embodiment. The process shown in FIG. 2 is applicable where the vehicle 10 is in either a power mode or a regenerative mode. According to the first embodiment, a target value (hereinafter referred to as "target drive force Ftar") [N] for the drive force F of the motor 12 may be calculated basically by a process similar to the process disclosed in US 2009/0112386 A1. Specifically, whereas US 2009/0112386 A1 uses the torque of the electric motor 2 as a controlled quantity, the first embodiment handles the motor drive force F as controlled quantity in place of the torque. The torque can be calculated by multiplying the drive force F by the radius of a road wheel, not shown.

In step S1 shown in FIG. 2, the ECU 34 judges whether or not the shift range corresponding to the shift position Ps detected by the shift position sensor 28 is the D range or the B range. If the shift range is not the D range or the B range, i.e., if the shift range is the P range, the N range, or the R range (S1: NO), then the process shown in FIG. 2 is ended, and a target driver force Ftar is separately established for the motor 12. If the shift range is the D range or the B range (S1: YES), then control goes to step S2.

In step S2, the ECU 34 calculates a basic drive force Fbase. The ECU 34 calculates the basic drive force Fbase based on the AP opening degree θap detected by the AP opening degree sensor 20, the shift position Ps (or shift range) detected by the shift position sensor 28, and the vehicle speed V detected by the vehicle speed sensor 30. Specifically, the ECU 34 calculates the basic drive force Fbase using a map of basic drive forces Fbase in combination with AP opening degrees θap and vehicle speeds V depending on shift positions Ps (shift ranges). For illustrative purposes, it is assumed that a basic drive force Fbase for driving the vehicle 10 in the power mode is of a positive value, whereas a basic drive force Fbase for operating the vehicle 10 in the regenerative mode is of a negative value.

The AP opening degree θap and the vehicle speed V are used in the same manner as with US 2009/0112386 A1, and the basic drive force Fbase corresponds to the basic target torque Trs disclosed in US 2009/0112386 A1. Consequently, a basic drive force Fbase can be calculated in the same manner as the basic target torque Trs disclosed in US 2009/0112386 A1 (see paragraphs [0071] and [0082] of US 2009/0112386 A41).

However, according to the first embodiment, the vehicle 10 has the D range and the B range each as a shift range for driving the vehicle 10 forward, unlike US 2009/0112386 A1. According to the first embodiment, a map of basic drive forces Fbase in combination with AP opening degrees θap and vehicle speeds V is established in advance for each of the D range and the B range, and a basic drive force Fbase is calculated using these maps. As described above, the amount of electric power regenerated by the motor 12 is greater in the B range than in the D range. Consequently, a basic drive force Fbase in the regenerative mode is smaller in the B range (its absolute value is greater because a basic drive force Fbase for operating the vehicle 10 in the regenerative mode is of a negative value).

According to the first embodiment, a process for controlling a basic drive force Fbase for operating the vehicle 10 in the regenerative mode will be referred to as "accelerator regenerative control process" as distinguished from "downhill regenerative control process" to be described below.

In step S3, the ECU 34 performs a downhill regenerative control process and calculates a downhill regenerative correction quantity ΔF1. The downhill regenerative correction quantity ΔF1 is used to accelerate the vehicle 10 gradually while the vehicle 10 is driving on a downhill road, and is similar to the downhill road regenerative correaction quantity ΔTrd disclosed in US 2009/0112386 A1 (see paragraph [0074] of US 2009/0112386 A1). According to the first embodiment, however, the downhill regenerative correaction quantity ΔF1 is suitable for the vehicle 10 which has a plurality of forward driving ranges (the D range and the B range). Details of the calculation of the downhill regenerative correction quantity ΔF1 (downhill regenerative control process) will be described later with reference to FIGS. 3, 7, 8, etc.

In step S4 in FIG. 2, the ECU 34 calculates a temporary target drive force Ftar_temp. Specifically, the ECU 34 calculates the sum of the basic drive force Fbase calculated in step S2 and the downhill regenerative correction quantity ΔF1 calculated in step S3 as a temporary target drive force Ftar_temp.

In step S5, the ECU 34 calculates a braking regenerative correction quantity ΔF2. The braking regenerative correction quantity ΔF2 is a correction quantity for the motor drive force F which is set in response to the brake pedal 22 being depressed, and is used to enhance the drivability of the vehicle 10. The braking regenerative correction quantity ΔF2 is similar to the braking regenerative correction quantity ΔTrb disclosed in US 2009/0112386 A1 in that it is established based on the BP opening degree θbp. Therefore, the braking regenerative correction quantity ΔF2 can be calculated in the same manner as the braking regenerative correction quantity ΔTrb disclosed in US 2009/0112386 A1, for example (see paragraphs [0073] and of US 2009/0112386 A1). A process of correcting the temporary target drive force Ftar_temp using the braking regenerative correction quantity ΔF2 is referred to as a drivability filtering process.

In step S6, the ECU 34 calculates a target drive force Ftar. Specifically, the ECU 34 calculates the sum of the temporary target drive force Ftar_temp calculated in step S4 and the braking regenerative correction quantity ΔF2 calculated in step S5 as a target drive force Ftar.

[2-2. Calculation of Downhill Regenerative Correction Quantity ΔF1 (Downhill Regenerative Control Process)]

(2-2-1. Concept of Downhill Regenerative Control Process)

Figure 3:
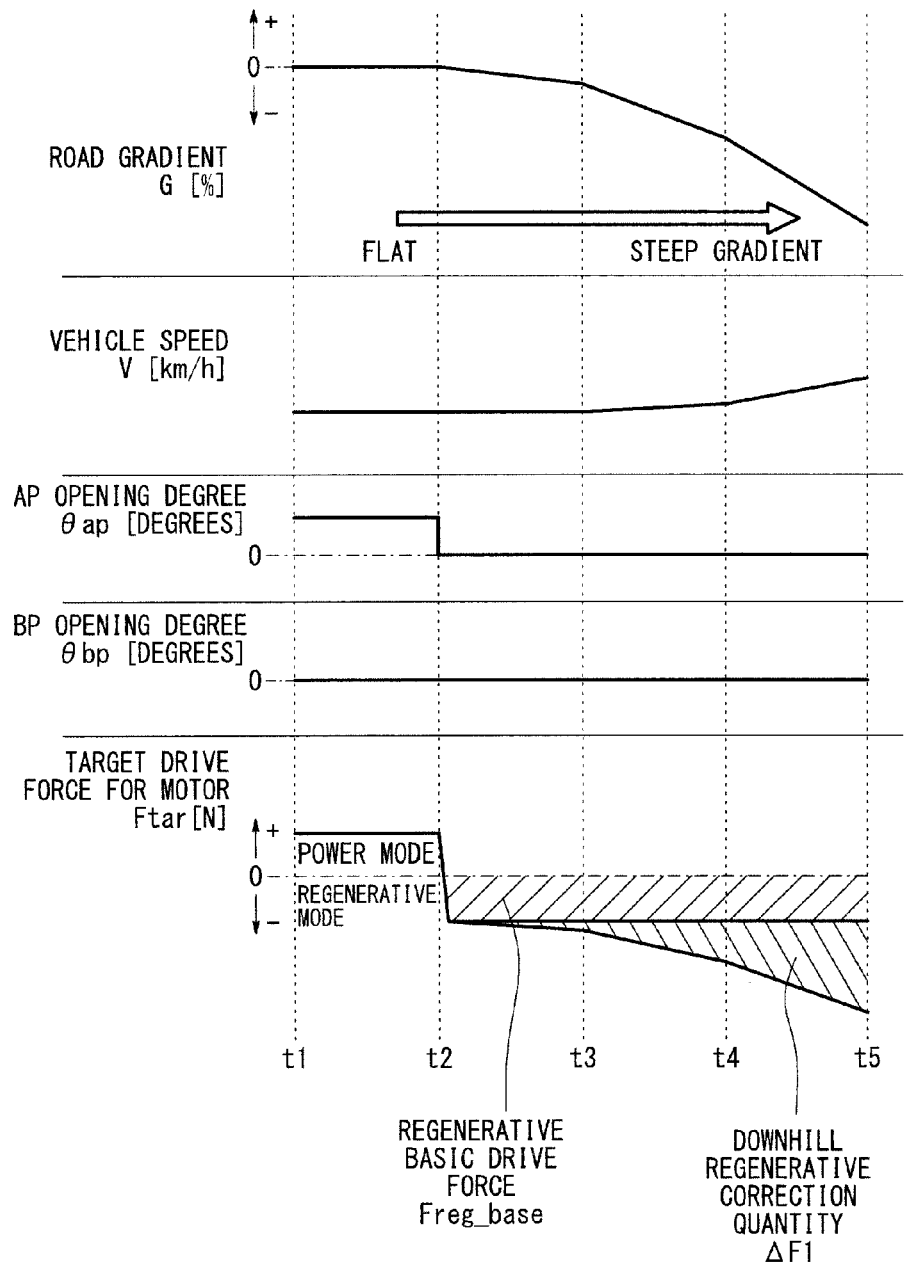
FIG. 3 is a timing chart showing by way of example the relationship between the road surface gradient, the vehicle speed, the accelerator pedal opening degree, the brake pedal opening degree, and the target drive force for the traction motor in various control processes according to the first embodiment.

The concept of the downhill regenerative control process according to the first embodiment will be described below. FIG. 3 is a timing chart showing by way of example the relationship between the road surface gradient G, the vehicle speed V, the AP opening degree θap, the BP opening degree θbp, and the target drive force Ftar for the motor 12 in the various control processes according to the first embodiment. For illustrative purposes, the road surface gradient G shown in FIG. 3 is 0% when the road is flat, is of a positive value when the road is uphill, and is of a negative value when the road is downhill (The same will apply hereinafter).

As shown in FIG. 3, the gradient of the road on which the vehicle 10 is driving, i.e., the road surface gradient G, is 0% (i.e., flat road) from time t1 to time t2, and becomes lower from time t2 toward time t5, i.e., the gradient G of the downhill road becomes sharper from time t2 toward time t5. At time t2, the driver returns the accelerator pedal 18 to its original position, causing the AP opening degree θap to return to zero. When the various control processes according to the first embodiment are used at this time, the vehicle speed V increases more gradually than the road surface gradient G decreases, i.e., the absolute value of the road surface gradient G increases.

Specifically, according to the first embodiment, when the AP opening degree θap goes to zero at time t2, the basic drive force Fbase reaches a predetermined value (hereinafter referred to as "regenerative basic drive force Freg_base") (accelerator regenerative control process). The regenerative basic drive force Freg_base is of a fixed value which is set when the AP opening θap is zero, and represents a drive force F corresponding to engine braking which is generated by a regenerative electric generation process performed by the motor 12. After the vehicle 10 has entered the downhill road at time t2, the driver does not depress the brake pedal 22, keeping the BP opening degree θbp at zero. Therefore, if only the regenerative basic drive force Freg_base, which is of a fixed value for the regenerative mode, is applied, then the vehicle speed V tends to increase sharply.

According to the first embodiment, the downhill regenerative correction quantity ΔF1 established according to the downhill regenerative control process is used. Specifically, according to the first embodiment, the downhill regenerative correction quantity ΔF1 is established depending on the road surface gradient G in addition to the regenerative basic drive force Freg_base. For example, since the road surface gradient G is continuously decreasing, i.e., the absolute value of the road surface gradient G is continuously increasing, after time t2, the downhill regenerative correction quantity ΔF1 is increased. Consequently, while the vehicle 10 is driving on the downhill road, the vehicle 10 can be accelerated gradually without the driver depressing the brake pedal 22.

(2-2-2. Characteristics for Achieving the Downhill Regenerative Control Process)

Figure 4:
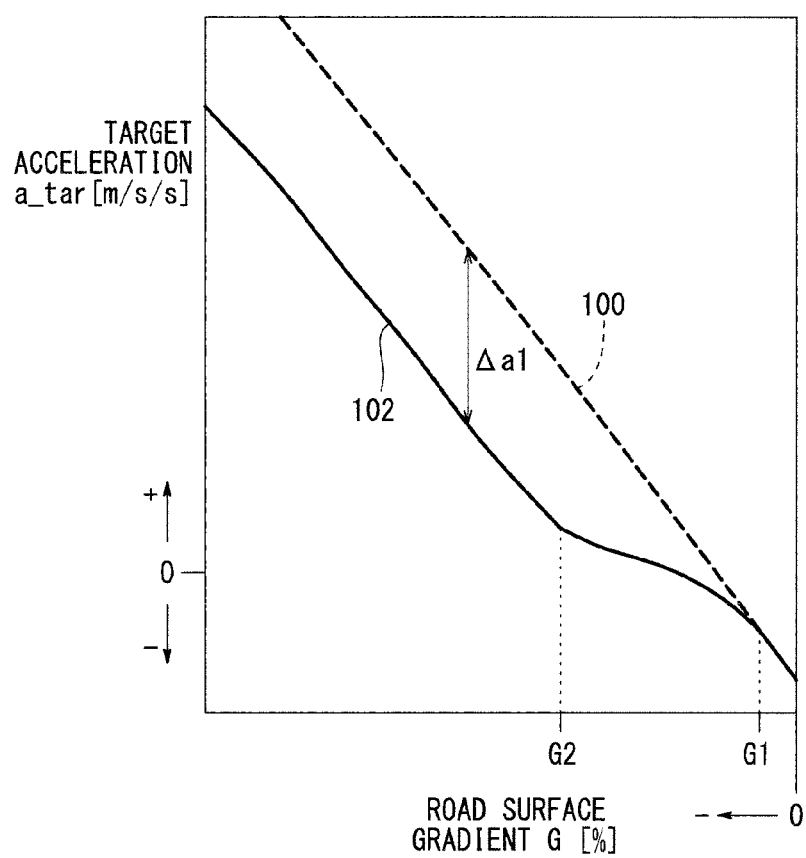
FIG. 4 is a characteristic diagram showing by way of example the relationship between the road surface gradient and the target acceleration used in a downhill regenerative control process while the D range is being selected.

FIG. 4 is a characteristic diagram showing by way of example the relationship between the road surface gradient G and the target acceleration a_tar used in a downhill regenerative control process while the D range is being selected. The characteristics shown in FIG. 4 are plotted when the vehicle speed V is of a certain value, and may be changed depending on the vehicle speed V. Stated otherwise, characteristic diagrams (maps) as shown in FIG. 4 are plotted for respective different values of the vehicle speed V, and one of them is selected depending on the vehicle speed V. According to the first embodiment, not only the characteristics for the D range shown in FIG. 4, but also the characteristics for both the D range and the B range (see FIG. 5), are used.

In FIG. 4, a characteristic curve 100 indicated by the broken line is applied when only the regenerative basic drive force Freg_base (accelerator regenerative control process) is used, and a characteristic curve 102 indicated by the solid line is applied when both the regenerative basic drive force Freg_base (accelerator regenerative control process) and the downhill regenerative correction quantity ΔF1 (downhill regenerative control process) are used. According to the first embodiment, as described above, since both the regenerative basic drive force Freg_base (accelerator regenerative control process) and the downhill regenerative correction quantity ΔF1 (downhill regenerative control process) are used, the characteristic curve 102 indicated by the solid line is used in the first embodiment. It should be noted that the characteristic curve 100 indicated by the broken line is illustrated for reference only, and is not used in the first embodiment.

As shown in FIG. 4, the characteristic curve 102 used in the first embodiment is the same as the characteristic curve 100 when the road surface gradient G changes from zero to a given value G1. Stated otherwise, the downhill regenerative control process is inhibited when the road surface gradient G changes from zero to a given value G1. Between the value G1 and a value G2, as the road surface gradient G decreases, i.e., the absolute value of the road surface gradient G increases, the characteristic curve 102 deviates from the characteristic curve 100. That is, the target acceleration a_tar represented by the characteristic curve 102 is lower than the target acceleration a_tar represented by the characteristic curve 100, thereby making it possible for the vehicle 10 to accelerate gradually on the downhill road. When the road surface gradient G becomes smaller than the value G2, i.e., when the absolute value of the road surface gradient G becomes greater than that of the value G2, the difference (hereinafter referred to as "difference Δa1") between the target acceleration a_tar represented by the characteristic curve 102 and the target acceleration a_tar represented by the characteristic curve 100 becomes constant.

According to the downhill regenerative control process, as described above, inasmuch as the downhill regenerative correction quantity ΔF1 is used in addition to the regenerative basic drive force Freg_base, the vehicle is able to accelerate gradually on the downhill road, whereby the manipulation performance by the driver is enhanced.

(2-2-3. Road Surface Gradient G Versus Target Acceleration a_Tar Characteristics for D Range and B Range)

According to the first embodiment, as described above, the vehicle 10 has the B range in addition to the D range as shift ranges for driving the vehicle 10 forward. According to the first embodiment, road surface gradient G versus target acceleration a_tar characteristics are established for respective different values of the vehicle speed V for each of the D range and the B range.

Figure 5:
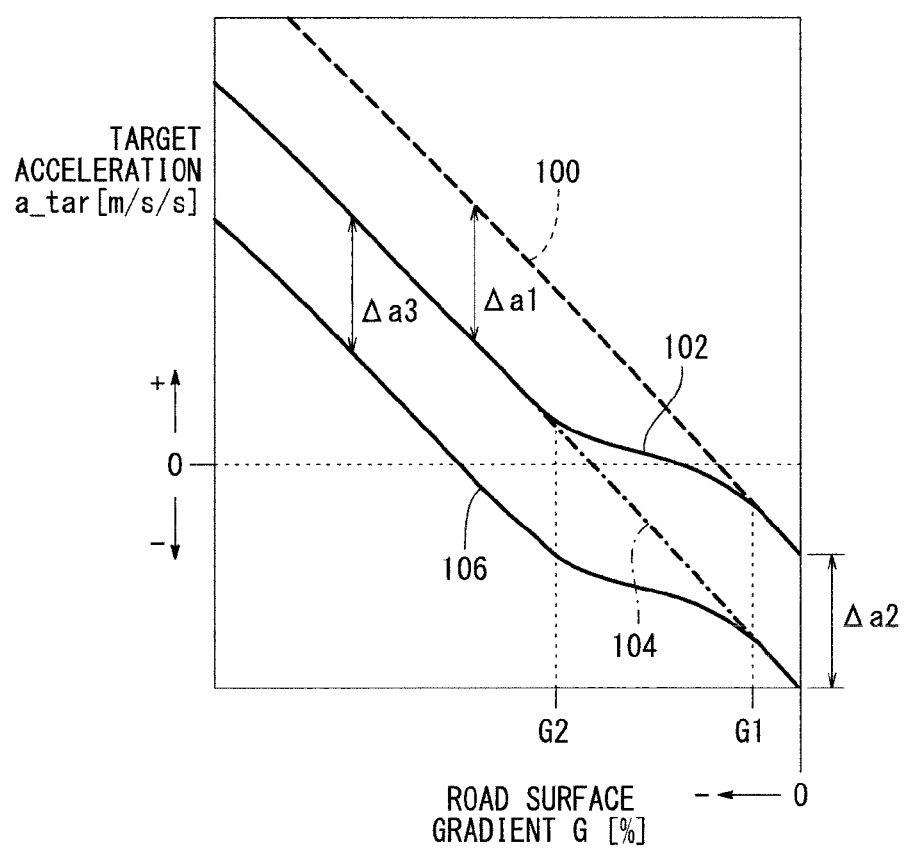
FIG. 5 is a characteristic diagram showing by way of example the relationship between the road surface gradient and the target acceleration for each of the D range and the B range used in the first embodiment.

FIG. 5 is a characteristic diagram showing by way of example the relationship between the road surface gradient G and the target acceleration a_tar for each of the D range and the B range used in the first embodiment. The characteristics shown in FIG. 5 are plotted when the vehicle speed V is of a certain value, and may be changed depending on the vehicle speed V. Stated otherwise, characteristic diagrams (maps) as shown in FIG. 5 are plotted for respective different values of the vehicle speed V, and one of them is selected depending on the vehicle speed V.

In FIG. 5, a characteristic curve 100 indicated by the broken line and a characteristic curve 102 indicated by the solid line are identical to those shown in FIG. 4. The characteristic curve 102 is used for the D range according to the first embodiment, and the characteristic curve 100 is shown for reference only, not used in the first embodiment.

A characteristic curve 104 indicated by the dot and-dash line is applied when only the regenerative basic drive force Freg_base (accelerator regenerative control process) is used for the B range, and a characteristic curve 106 indicated by the solid line is applied when both the regenerative basic drive force Freg_base (accelerator regenerative control process) and the downhill regenerative correction quantity ΔF1 (downhill regenerative control process) are used for the B range. According to the first embodiment, as described above, since both the regenerative basic drive force Freg_base and the downhill regenerative correction quantity ΔF1 are used also for the B range, the characteristic curve 106 indicated by the solid line is used in the first embodiment. It should be noted that the characteristic curve 104 indicated by the dot-and-dash line is illustrated for reference only, and is not used in the first embodiment.

A comparison of the characteristic curve 102 for the D range and the characteristic curve 106 for the B range indicates that the target acceleration a_tar for the B range is smaller than the target acceleration a_tar for the D range at the same road surface gradient G. This is because the amount of electric power regenerated by the motor 12 (regenerated electric power Preg) is greater for the B range than for the D range. Therefore, the amount of charge for the battery 16 is greater when the B range is used.

When the road surface gradient G is equal, the target acceleration a_tar represented by the characteristic curve 106 for the B range is set to be always lower than the target acceleration a_tar represented by the characteristic curve 102 for the D range. More specifically, according to the first embodiment, the difference between the target acceleration a_tar represented by the characteristic curve 102 for the D range and the target acceleration a_tar represented by the characteristic curve 106 for the B range is always constant at any value of the road surface gradient G. In other words, the difference (hereinafter referred to as "difference Δa2") between the characteristic curve 102 and the characteristic curve 106 in a region wherein the road surface gradient G changes from zero to the value G1, i.e., a region wherein the downhill regenerative control process is inhibited, and the difference (hereinafter referred to as "difference Δa3") between the characteristic curve 102 and the characteristic curve 106 in a region wherein the road surface gradient G is lower than the value G1, i.e., a region wherein the downhill regenerative control process is permitted, are constant and equal to each other. Consequently, in a case where the range is switched from the D range to the B range when the vehicle 10 is driving on the downhill road, the vehicle 10 is more decelerated than before.

Figure 6:
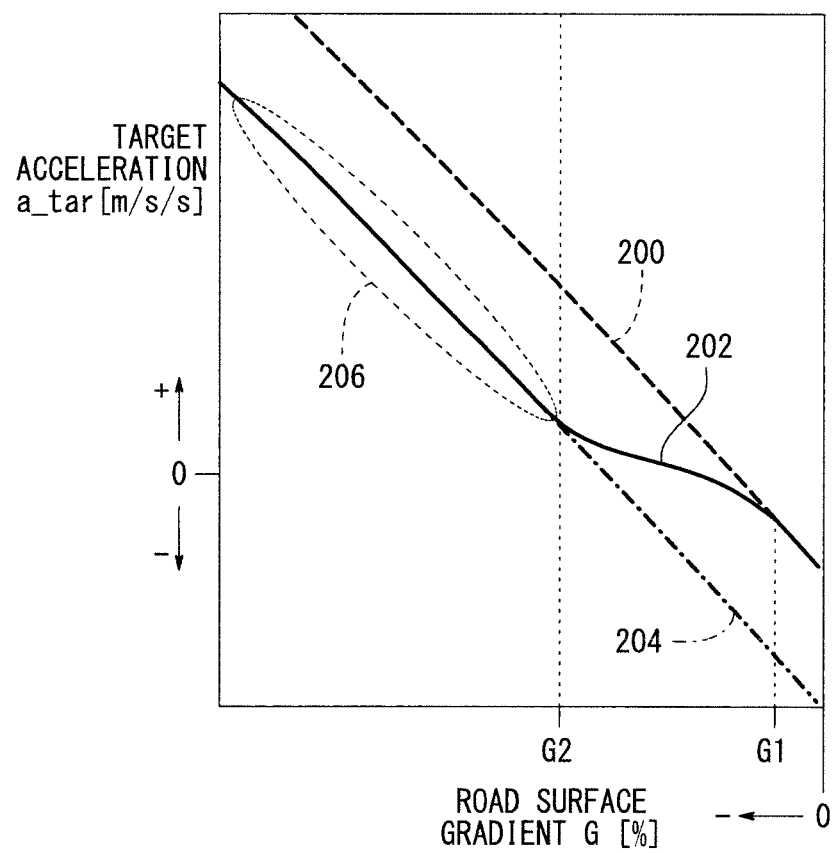
FIG. 6 is a characteristic diagram showing by way of example the relationship between the road surface gradient and the target acceleration for each of the D range and the B range used in a comparative example.

Characteristics shown in FIG. 6 according to a comparative example will be described below in order to illustrate the advantages of the above characteristic curves 102, 106. FIG. 6 is a characteristic diagram showing by way of example the relationship between the road surface gradient G and the target acceleration a_tar for each of the D range and the B range used in a comparative example. The characteristics shown in FIG. 6 are plotted at the same vehicle speed V as the characteristics shown in FIG. 5.

A characteristic curve 200 indicated by the broken line and a characteristic curve 202 indicated by the solid line in FIG. 6 are identical to the characteristic curves 100, 102 shown in FIG. 5. A characteristic curve 204 indicated by the dot-and-dash line in FIG. 6 is identical to the characteristic curve 104 (for reference only) indicated by the dot-and-dash line in FIG. 5. In the comparative example, the characteristic curve 204 is actually used for the B range. Stated otherwise, the characteristic curve 106 for the B range indicated by the solid line in FIG. 5 is not used in the comparative example.

According to the comparative example shown in FIG. 6, as can be seen from the above description, when the vehicle 10 is driving in the D range, both the regenerative basic drive force Freg_base (accelerator regenerative control process) and the downhill regenerative correction quantity ΔF1 (downhill regenerative control process) are used, and when the vehicle 10 is driving in the B range, only the regenerative basic drive force Freg_base (accelerator regenerative control process) is used.

When the road surface gradient G becomes smaller than the value G2, i.e., when the absolute value of the road surface gradient G becomes greater than that of the value G2, the characteristic curve 202 for the D range and the characteristic curve 204 for the B range agree with each other in an elliptical region 206 indicated by the broken line. Therefore, even when the range is switched from the D range to the B range while the vehicle 10 is driving on the downhill road whose road surface gradient G is smaller than the value G2, i.e., on a downhill road steeper than the road having the value G2, the target acceleration a_tar remains unchanged. As a result, the driver tends to feel strange and uncomfortable.

In addition, when the range is switched from the D range to the B range, it is considered that the driver is seeking a greater deceleration. According to the comparative example shown in FIG. 6, however, even when the driver changes from the D range to the B range, since the target acceleration a_tar remains unchanged, the deceleration of the vehicle 10 does not increase. As a result, the driver is possibly forced to depress the brake pedal 22, thereby tending to impair the driving performance of the vehicle 10.

In contrast thereto, according to the first embodiment, the above problems can be solved because the characteristic curves 102, 106 shown in FIG. 5 are used.

(2-2-4. Details of Calculation of the Downhill Regenerative Correction Quantity ΔF1 (Downhill Regenerative Control Process))

Figure 7:
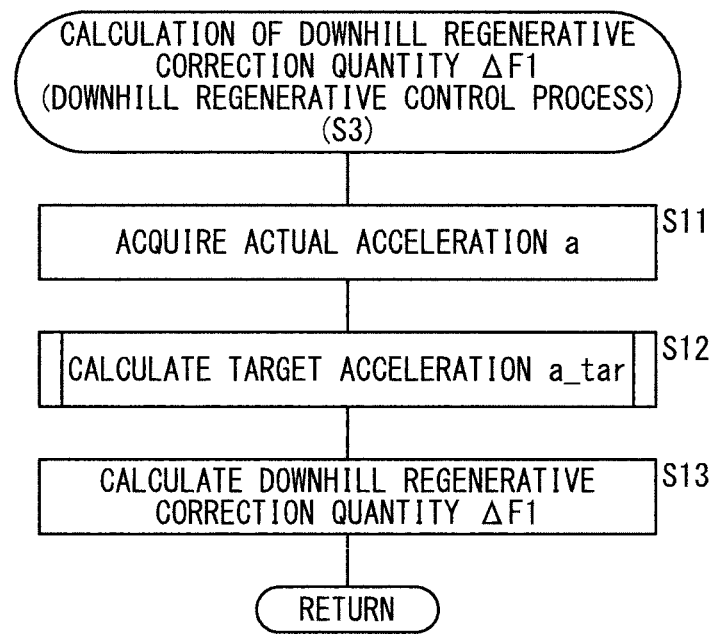
FIG. 7 is a flowchart of a process of calculating a downhill regenerative correction quantity (downhill regenerative control process) (details of S3 in FIG. 2) according to the first embodiment.

Details of the calculation of a downhill regenerative correction quantity ΔF1 (FIG. 3) (downhill regenerative control process) in step S3 in FIG. 2 will be described below. FIG. 7 is a flowchart of a process of calculating a downhill regenerative correction quantity ΔF1 (downhill regenerative control process) (details of S3 in FIG. 2) according to the first embodiment.

In step S11, the ECU 34 acquires the actual acceleration a of the vehicle 10 from the acceleration sensor 32. In step S12, the ECU 34 calculates a target acceleration a_tar (see FIG. 5). Details of the calculation of a target acceleration a_tar will be described later with reference to FIG. 8.

In step S13, the ECU 34 calculates a downhill regenerative correction quantity ΔF1. Specifically, the ECU calculates the difference (hereinafter referred to as "difference D1") between the actual acceleration a and the target acceleration a_tar, and then calculates a downhill regenerative correction quantity ΔF1 according to a feedback control process depending on the difference D1. Stated otherwise, as the absolute value of the difference D1 is greater, the absolute value of the downhill regenerative correction quantity ΔF1 is greater.

Figure 8:
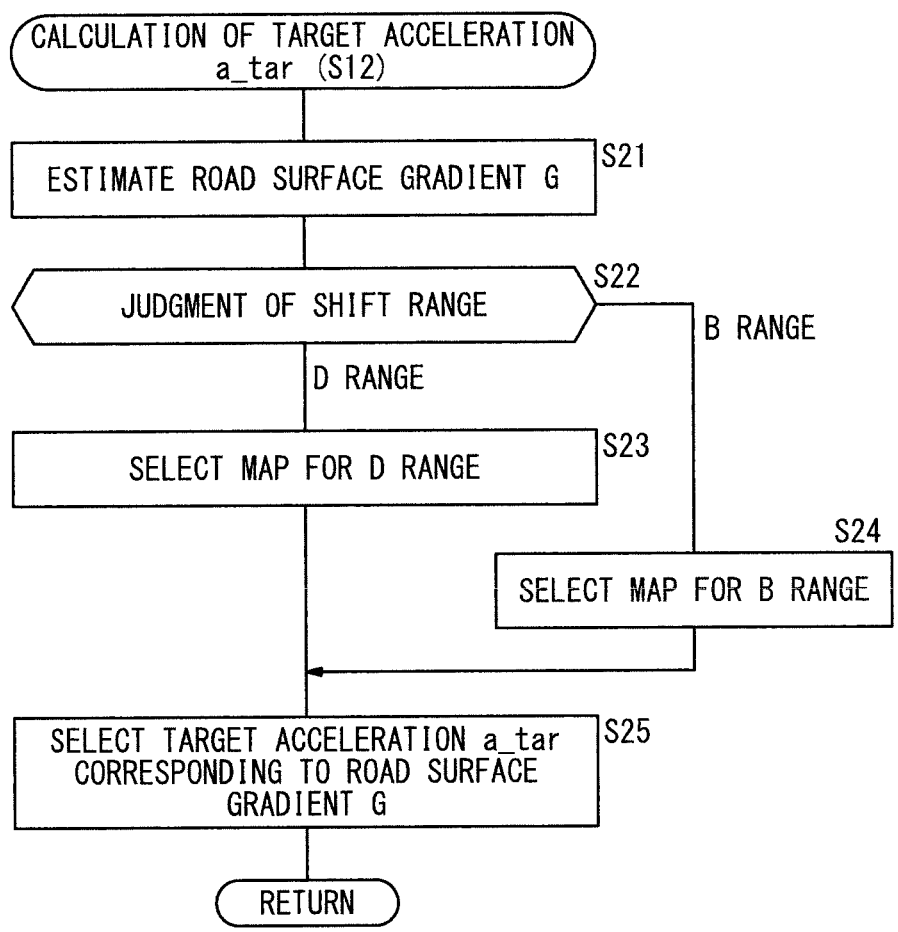
FIG. 8 is a flowchart of a process of calculating a target acceleration (details of S12 in FIG. 7) according to the first embodiment.

FIG. 8 is a flowchart of a process of calculating a target acceleration a_tar (details of S12 in FIG. 7) according to the first embodiment. In step S21, the ECU 34 estimates a road surface gradient G. Specifically, the ECU 34 calculates a road surface gradient G using the acceleration a from the acceleration sensor 32, etc. For example, the ECU 34 may estimate a road surface gradient G according to the process disclosed in US 2009/0112386 A1 (see FIG. 5, paragraphs [0076], [0077], [0090] through [0110] of US 2009/0112386 A1). Alternatively, the ECU 34 may estimate a road surface gradient G according to other existing processes.

In step S22, the ECU 34 judges a shift range. If the shift range is the D range, then the ECU 34 selects the map for the D range, i.e., the characteristic curve 102 in FIG. 5, in step S23. If the shift range is the B range, then the ECU 34 selects the map for the B range, i.e., the characteristic curve 106 in FIG. 5, in step S24. As described above, each of the maps, i.e., the characteristic curves 102, 106 in FIG. 5, is selected depending on the vehicle speed V. Therefore, the ECU 34 also uses the vehicle speed V from the vehicle speed sensor 30 in selecting a map.

After step S23 or S24, the ECU 34 selects, in step S25, a target acceleration a_tar corresponding to the road surface gradient G estimated in step S21 according to the map selected in step S23 or S24, i.e., the characteristic curve 102 or 106 in FIG. 5.

3. Advantages of the First Embodiment

According to the first embodiment, as described above, when the road surface gradient G is of a value equal to or smaller than 0, at the same road surface gradient G, the target acceleration a_tar, i.e., the characteristic curve 106 in FIG. 5, for the B range is lower than the target acceleration a_tar, i.e., the characteristic curve 102 in FIG. 5, for the D range (see FIG. 5). Stated otherwise, when the road surface gradient G is 0 or less, at the same road surface gradient G, the deceleration for the B range is greater than the deceleration for the D range. Therefore, when the shift range is switched from the D range to the B range, the deceleration of the vehicle 10 is increased irrespectively of whether the vehicle 10 is driving on a flat road or a downhill road. The vehicle 10 thus makes the driver feel decelerated, and prevents the driver from having a feeling of irresponsiveness to the driver's operation. Further, when the shift range is switched from the B range to the D range, the vehicle 10 makes the driver feel accelerated irrespectively of whether the vehicle 10 is driving on a flat road or a downhill road. Thus, the vehicle 10 prevents the driver from feeling strange and uncomfortable due to the unchanged acceleration. Consequently, it is possible to perform an appropriate regenerative control process for the vehicle 10 which has a plurality of forward driving ranges, i.e., the D range and the B range.

According to the first embodiment, the difference Δa2 between the characteristic curve 102 and the characteristic curve 106 in the region wherein the road surface gradient G changes from 0 to the value G1, i.e., the region wherein the downhill regenerative control process is inhibited, and the difference Δa3 between the characteristic curve 102 and the characteristic curve 106 in the region wherein the road surface gradient G is lower than the value G1, i.e., the region wherein the downhill regenerative control process is permitted, are constant and equal to each other.

With the above arrangement, the driver is able to recognize a change in the acceleration (deceleration) similarly when the D range and the B range are switched while the vehicle 10 is in the downhill regenerative control process and when the D range and the B range are switched while the vehicle 10 is in the accelerator regenerative control process on a flat road. Therefore, the electric vehicle 10 can prevent the driver from having a feeling of irresponsiveness to the driver's operation or can make the driver feel more accelerated.

B. Second Embodiment

1. Differences from the First Embodiment

Figure 11:
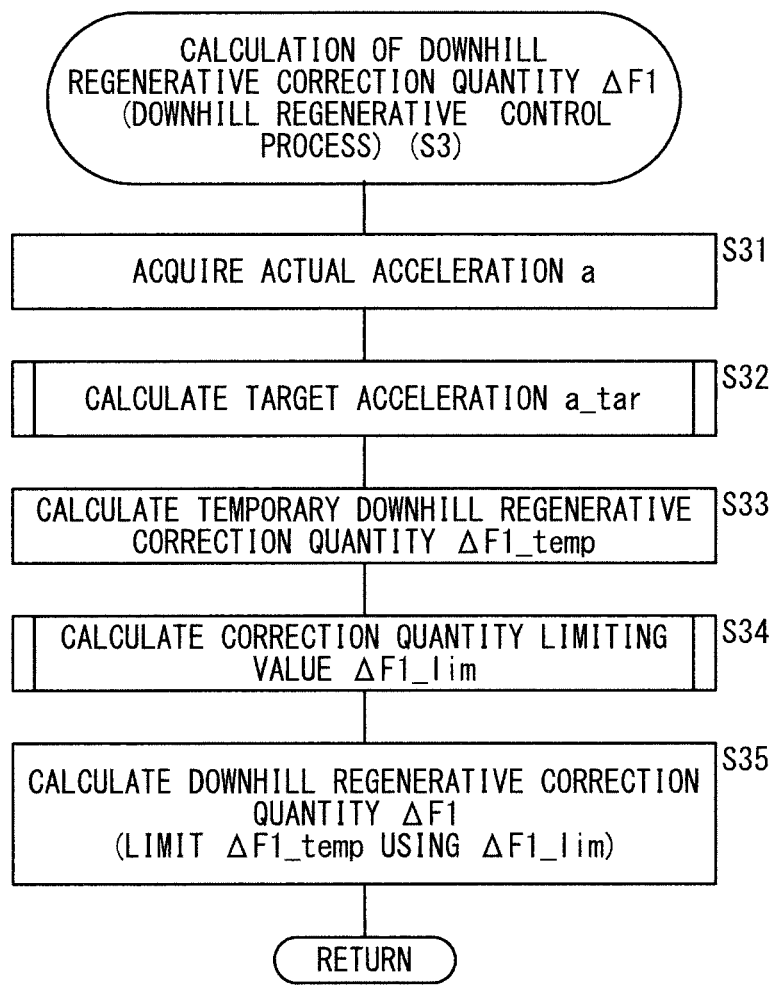
FIG. 11 is a flowchart of a process of calculating a downhill regenerative correction quantity (downhill regenerative control process) (details of S3 in FIG. 2) according to the second embodiment.

The arrangement of hardware according to the second embodiment is identical to the arrangement of hardware according to the first embodiment (see FIG. 1). The second embodiment is different from the first embodiment as to the processing sequence carried out by the ECU 34. More specifically, the second embodiment is different from the first embodiment in that, instead of the characteristics shown in FIG. 5 and the flowchart shown in FIG. 7 according to the first embodiment, characteristics shown in FIG. 9 and a flowchart shown in FIG. 11 are used according to the second embodiment. Those parts of the second embodiment which are identical to those of the first embodiment are denoted by identical reference characters, and will not be described in detail below.

2. Calculation of Downhill Regenerative Correction Quantity ΔF1 (Downhill Regenerative Control Process)

[2-1. Road Surface Gradient G Versus Target Acceleration a_Tar Characteristics for D Range and B Range]

Figure 9:
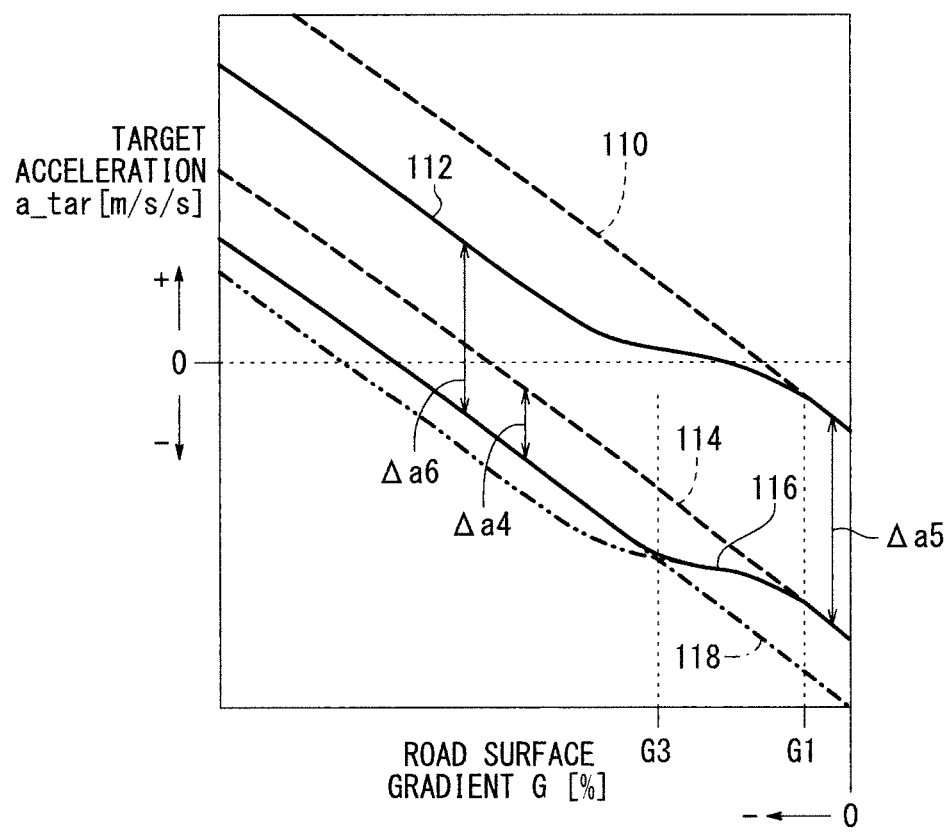
FIG. 9 is a characteristic diagram showing by way of example the relationship between the road surface gradient and the target acceleration for each of a D range and a B range used in a second embodiment of the present invention.

FIG. 9 is a characteristic diagram showing by way of example the relationship between the road surface gradient G and the target acceleration a_tar for each of a D range and a B range used in the second embodiment. The characteristics shown in FIG. 9 are plotted when the vehicle speed V is of a certain value, and may be changed depending on the vehicle speed V. Stated otherwise, characteristic diagrams (maps) as shown in FIG. 9 are plotted for respective different values of the vehicle speed V, and one of them is selected depending on the vehicle speed V.

In FIG. 9, a characteristic curve 110 indicated by the broken line and a characteristic curve 112 indicated by the solid line are identical to the characteristic curves 100, 102 shown in FIG. 5. The characteristic curve 112 is used for the D range according to the second embodiment, and the characteristic curve 110 is shown for reference only, not used in the second embodiment.

A characteristic curve 114 indicated by the broken line is applied when only the regenerative basic drive force Freg_base (accelerator regenerative control process) is used for the B range, and a characteristic curve 116 indicated by the solid line is applied when both the regenerative basic drive force Freg_base (accelerator regenerative control process) and the downhill regenerative correction quantity ΔF1 (downhill regenerative control process) are used for the B range. According to the second embodiment, as with the first embodiment, since both the regenerative basic drive force Freg_base and the downhill regenerative correction quantity ΔF1 are used also for the B range, the characteristic curve 116 indicated by the solid line is used in the second embodiment. It should be noted that the characteristic curve 114 indicated by the broken line is illustrated for reference only, and is not used in the second embodiment.

The second embodiment is different from the first embodiment in that use of the characteristic curve 106 for the B range is limited in order to prevent the target acceleration a_tar from changing excessively when the range is switched from the D range to the B range. Specifically, if the road surface gradient G is smaller than a prescribed value G3 in FIG. 9, i.e., if the absolute value of the road surface gradient G is greater than the absolute value of the prescribed value G3, then the characteristic curve 116 indicated by the solid line, which is produced by limiting the deceleration represented by a two-dot-and-dash-line curve, i.e., by reducing a reduction in the target acceleration a_tar, is used.

Specifically, according to the second embodiment, a regenerative drive force limiting value Freg_lim and a correction quantity limiting value ΔF1_lim are established for the characteristic curve 116 for the B range. The regenerative drive force limiting value Freg_lim represents a maximum regenerative drive force, whose value is minimum but whose absolute value is maximum, generated by the motor 12 when in the regenerative mode on a downhill road. The correction quantity limiting value ΔF1_lim represent a maximum value, whose value is minimum but whose absolute value is maximum, that can be taken by the downhill regenerative correction quantity ΔF1 at the regenerative drive force limiting value Freg_lim. Stated otherwise, the correction quantity limiting value ΔF1_lim is defined as the difference between the regenerative drive force limiting value Freg_lim and the regenerative basic drive force Freg_base (ΔF1_lim=Freg_lim−Freg_base).

Figure 10:
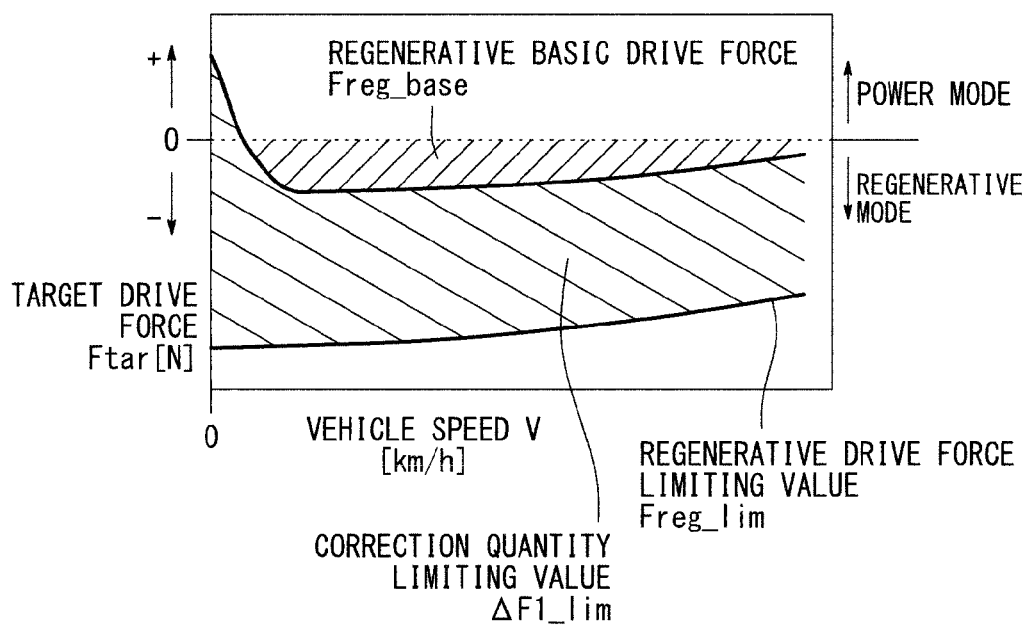
FIG. 10 is a diagram illustrating a regenerative drive force limiting value and a correction quantity limiting value used in the second embodiment.

FIG. 10 is a diagram illustrating the regenerative drive force limiting value Freg_lim and the correction quantity limiting value ΔF1_lim used in the second embodiment. According to the second embodiment, the regenerative drive force limiting value Freg_lim is established such that the deceleration of the vehicle 10 will not be excessively large. Specifically, as shown in FIG. 10, the regenerative drive force limiting value Freg_lim is established depending on the vehicle speed V. As the vehicle speed V is higher, the regenerative drive force limiting value Freg_lim is greater, i.e., the absolute value of the regenerative drive force limiting value Freg_lim is smaller. This is because when the vehicle 10 is driving at a high speed, the running resistance against the vehicle 10 is small.

As the road surface gradient G is steeper, the vehicle 10 is easier to accelerate. Therefore, the regenerative drive force limiting value Freg_lim may be changed depending on the road surface gradient G in addition to the vehicle speed V. For example, the map shown in FIG. 10 may be established with respect to each value of the road surface gradient G.

Referring back to FIG. 9, a characteristic curve 118 corresponds to the correction quantity limiting value ΔF1_lim. In other words, at the same road surface gradient G, the difference (hereinafter referred to as "difference Δa4") between the characteristic curve 114 and the characteristic curve 118 with respect to the target acceleration a_tar, is of a value corresponding to the correction quantity limiting value ΔF1_lim.

As can be seen from FIG. 10, according to the second embodiment, each of the regenerative basic drive force Freg_base, the regenerative drive force limiting value Freg_lim, and the correction quantity limiting value ΔF1_lim is established depending on the vehicle speed V. Therefore, if the AP opening degree θap is zero, the temporary target drive force Ftar_temp (S4 in FIG. 2) may be established based on only the vehicle speed V, in place of steps S2 through S4 in FIG. 2.

[2-2. Details of Calculation of the Downhill Regenerative Correction Quantity ΔF1 (Downhill Regenerative Control Process)]

Details of the calculation of the downhill regenerative correction quantity ΔF1 (downhill regenerative control process) according to the second embodiment will be described below. FIG. 11 is a flowchart of a process of calculating a downhill regenerative correction quantity ΔF1 (downhill regenerative control process) (details of S3 in FIG. 2) according to the second embodiment. Steps S31, S32 shown in FIG. 11 are identical to steps S11, S12 shown in FIG. 7. Therefore, the flowchart shown in FIG. 8 may be used as representing specific processing details of step S32.

In step S33 shown in FIG. 11, the ECU 34 calculates a temporary downhill regenerative correction quantity ΔF1 temp. The temporary downhill regenerative correction quantity ΔF1 temp is of a value for determining a downhill regenerative correction quantity ΔF1, or stated otherwise, a provisional downhill regenerative correction quantity ΔF1. The downhill regenerative correction quantity ΔF1 according to the first embodiment corresponds to the temporary downhill regenerative correction quantity ΔF1 temp according to the second embodiment.

In step S34, the ECU 34 calculates a correction quantity limiting value ΔF1_lim (see FIG. 10), as described in detail later with reference to FIG. 12. In step S35, the ECU 34 calculates a downhill regenerative correction quantity ΔF1. Specifically, the ECU 34 judges whether the temporary downhill regenerative correction quantity ΔF1_temp calculated in step S33 exceeds the correction quantity limiting value ΔF1_lim calculated in step S34 or not. Stated otherwise, the ECU 34 judges whether the characteristic curve 116 is lower than the characteristic curve 118 or not, in FIG. 9. As described above, the characteristic curve 118 corresponds to the correction quantity limiting value ΔF1_lim. In other words, when the vehicle speed V remains the same, the difference Δa4 between the characteristic curve 114 and the characteristic curve 118 with respect to the target acceleration a_tar corresponds to the correction quantity limiting value ΔF1_lim.

As a result, the difference (hereinafter referred to as "Δa6") between the characteristic curve 112 and the characteristic curve 116 at the time the road surface gradient G is smaller than the prescribed value G3 (i.e., at the time the absolute value of the road surface gradient G is greater than that of the prescribed value G3), is smaller than the difference (hereinafter referred to as "Δa5") between the characteristic curve 112 and the characteristic curve 116 at the time the road surface gradient G is greater than the prescribed value G3 (i.e., at the time the absolute value of the road surface gradient G is smaller than that of the prescribed value G3).

If the temporary downhill regenerative correction quantity ΔF1 temp does not exceed the correction quantity limiting value ΔF1_lim, then the temporary downhill regenerative correction quantity ΔF1_temp is used as downhill regenerative correction quantity ΔF1. If the temporary downhill regenerative correction quantity ΔF1 temp exceeds the correction quantity limiting value ΔF1_lim, then the correction quantity limiting value ΔF1_lim is used as downhill regenerative correction quantity ΔF1. In step S35, therefore, the ECU 34 performs a limiting process for stop-ping the temporary downhill regenerative correction quantity ΔF1 temp from exceeding the correction quantity limiting value ΔF1_lim.

Figure 12:
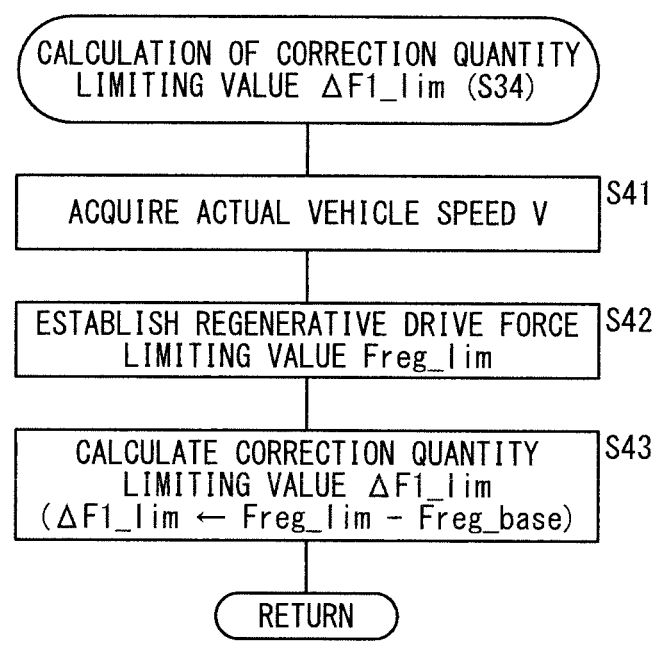
FIG. 12 is a flowchart of a process of calculating a correction quantity limiting value (details of S34 in FIG. 11) according to the second embodiment.

FIG. 12 is a flowchart of a process of calculating a correction quantity limiting value ΔF1_lim (details of S34 in FIG. 11) according to the second embodiment. In step S41, the ECU 34 acquires the vehicle speed V from the vehicle speed sensor 30. In step S42, the ECU 34 estab-lishes a regenerative drive force limiting value Freg_lim depending on the vehicle speed V, using the characteristics (map) shown in FIG. 10. As described above, the characteristics used herein may be switched depending on the road surface gradient G.

In step S43, the ECU 34 calculates a correction quantity limiting value ΔF1_lim. Specifically, the ECU 34 calculates a correction quantity limiting value ΔF1_lim by subtracting the regenerative basic drive force Freg_base from the regenerative drive force limiting value Freg_lim calculated in step S42 (ΔF1_lim=Freg_lim−Freg_base).

3. Advantages of the Second Embodiment

As described above, the second embodiment offers the following advantages in addition to or instead of the advantages of the first embodiment.

According to the second embodiment, when the road surface gradient G is steeper than the prescribed value G3, the difference between the target acceleration a_tar at the time the D range is selected and the target acceleration a_tar at the time the B range is selected is smaller than when the road surface gradient G is more gradual than the prescribed value G3. Stated otherwise, the difference Δa6 is smaller than the difference Δa5 in FIG. 9.

As the road surface gradient G is steeper, the vehicle 10 is easier to accelerate. Therefore, if a change in the target acceleration a_tar at the time of switching from the D range to the B range is constant regardless of the road surface gradient G, then change in the actual acceleration a (deceleration) is greater as the road surface gradient G is steeper. According to the second embodiment, when the road surface gradient G is steeper than the prescribed value G3, the difference between the target acceleration a_tar at the time the D range is selected and the target acceleration a_tar at the time the B range is selected is smaller. Consequently, it is possible to easily uniformize change in the actual acceleration a (deceleration).

According to the second embodiment, the prescribed value G3 is a value of the road surface gradient G at which the target acceleration a_tar changes from a positive value to a negative value when the shift range is switched from the D range to the B range (see FIG. 9). Therefore, when the range is switched from the D range to the B range, the change in the actual acceleration a (deceleration) at the time the vehicle 10 switches from an accelerated state to a decelerated state is reduced, thereby making it possible to achieve the driving stability of the vehicle 10 on a downhill road.

C. Modifications

The present invention is not limited to the above embodiments, but may employ various arrangements based on the disclosure of the above description. For example, the present invention may employ the following arrangements.

1. Objects to which the Present Invention is Applicable

In the above embodiments, the vehicle 10 which has the single motor 12 and the single battery 16 has been described (see FIG. 1). However, the present invention is not limited to the illustrated vehicle 10, but is applicable to other objects. For example, the present invention is applicable to an electric vehicle having a propulsive motor and a regenerative motor separately. The present invention is also applicable to a hybrid vehicle having an engine in addition to the motor 12. Furthermore, the present invention is also applicable to a fuel cell vehicle having a fuel cell in addition to the motor 12 and the battery 16. Still further, the present invention is applicable not only to the electric vehicle 10 but also to another mobile body or a movable apparatus, e.g., a robot arm, having a plurality of forward driving ranges (driving ranges in one direction). The vehicle 10 is not limited to a four-wheeled vehicle, but may be a truck, a motorcycle, an electric-motor-assisted bicycle, and the like.

2. Shift Ranges

In each of the above embodiments, the shift ranges include the P range, the N range, the R range, the D range, and the B range. However, the shift ranges are not limited to these ranges, but may include other ranges insofar as they have a plurality of shift ranges for driving in one direction (the D range and the B range in the above embodiment).

In each of the above embodiments, the driver switches to each of the shift ranges with the shift lever 26. However, the driver may switch to each of the shift ranges, particularly at least one of the D range and the B range, using another switching device. For example, the driver may switch between the D range and the B range, for example, using a button (not shown) on the steering wheel, in addition to or instead of the shift lever 26.

3. Accelerator Regenerative Control Process and Downhill Regenerative Control Process:

In each of the above embodiments, both the accelerator regenerative control process and the downhill regenerative control process have been described as being carried out for each of the D range and the B range. However, insofar as the accelerator regenerative control process and the downhill regenerative control process are carried out in effect, these control processes do not need to be formally distinguished from each other. For example, the accelerator regenerative control process may be included in the downhill regenerative control process. Stated otherwise, a regenerative control process that is performed while the vehicle is driving downhill may be collectively called a downhill regenerative control process, and the accelerator regenerative control process may be included in the downhill regenerative control process.

In the second embodiment, when the B range is selected, a correction quantity limiting value $\Delta F1\_lim$ is calculated at all times (see FIGS. 11 and 12). However, a correction quantity limiting value $\Delta F1\_lim$ may be calculated only until a prescribed condition is satisfied after switching from the D range to the B range. For example, the prescribed condition may be satisfied when a prescribed period has elapsed after switching from the D range to the B range or when the correction quantity limiting value $\Delta F1\_lim$ that is increased at a certain rate reaches the original characteristic curve 116 (i.e., the section indicated by the two-dot-dash line of the characteristic curve 116 shown in FIG. 9) after switching from the D range to the B range. Consequently, the correction quantity limiting value $\Delta F1\_lim$ is used temporarily, and it is possible to use a characteristic curve that is originally established as the characteristic curve 116 (the section indicated by the two-dot-dash line of the characteristic curve 116 shown in FIG. 9).

The invention claimed is:

1. A method of controlling an electric vehicle having a shift range switching device for switching between a parking range, a reverse driving range, a first forward driving range, and a second forward driving range as shift ranges, the method comprising:

when the driver closes an accelerator of the electric vehicle on a flat road, carrying out an accelerator regenerative control process for applying, to the electric vehicle, a braking force equivalent to engine braking by regenerative electric generation by an electric motor;

wherein a deceleration of the electric vehicle in the accelerator regenerative control process at the time the second forward driving range is selected, is greater than a deceleration of the electric vehicle in the accelerator regenerative control process at the time the first forward driving range is selected; and when the electric vehicle is driving on a downhill road, carrying out a downhill regenerative control process for adjusting an amount of electric power regenerated by the electric motor such that an acceleration of the electric vehicle at the time the accelerator is closed, is equal to a downhill acceleration depending on a road surface gradient;

wherein the downhill acceleration at the time the second forward driving range is selected, is smaller than the downhill acceleration at the time the first forward driving range is selected, throughout a region of the road surface gradient that is established as a control range, and wherein when the road surface gradient is steeper than a prescribed value, a difference between the downhill acceleration at the time the first forward driving range is selected and the downhill acceleration at the time the second forward driving range is selected, is smaller than the difference between the downhill acceleration at the time the first forward driving range is selected and the downhill acceleration at the time the second forward driving range is selected, when the road surface gradient is more gradual than the prescribed value.

2. The method of controlling the electric vehicle according to claim 1, wherein a difference between the downhill acceleration at the time the first forward driving range is selected and the downhill acceleration at the time the second forward driving range is selected, is equal to a difference between a deceleration in the accelerator regenerative control process at the time the first forward driving range is selected and a deceleration in the accelerator regenerative control process at the time the second forward driving range is selected.

3. The method of controlling the electric vehicle according to claim 1, wherein the prescribed value is a value of the road surface gradient at which the downhill acceleration changes from a positive value to a negative value when the shift range is switched from the first forward driving range to the second forward driving range.

* * * * *